United States Patent [19]

Ibe

[11] Patent Number: 4,639,235

[45] Date of Patent: Jan. 27, 1987

[54] ATTACHABLE EYE FOR DOLLS

[76] Inventor: Rebecca C. Ibe, 39290 Prentiss, Mt. Clemens, Mich. 48045

[21] Appl. No.: 709,674

[22] Filed: Mar. 8, 1985

[51] Int. Cl.$^4$ .......................... A63H 3/38; A01N 1/00; B32B 3/00

[52] U.S. Cl. .................................... 446/389; 446/392; 428/16; 428/204

[58] Field of Search ............... 446/389, 391, 392, 385, 446/387, 341, 343, 100; 106/DIG. 3; 428/15, 16, 204

[56] References Cited

U.S. PATENT DOCUMENTS

| | | | |
|---|---|---|---|
| 1,219,058 | 3/1917 | Weber | 446/387 X |
| 1,337,354 | 4/1920 | Garrigue | 446/389 X |
| 1,358,470 | 11/1920 | Schoenhut | 446/392 |
| 1,369,797 | 3/1921 | Fauer | 446/392 |
| 1,832,743 | 11/1931 | Shuldiner | 446/392 |
| 1,916,811 | 7/1933 | Schwartz | 446/100 |
| 1,963,129 | 6/1934 | Grubman | 446/389 |
| 2,333,641 | 11/1943 | Corwin | 446/385 X |
| 4,025,674 | 5/1977 | Mizuochi | 428/204 X |
| 4,294,634 | 10/1981 | Mookil | 428/16 X |
| 4,378,392 | 3/1983 | Segel | 428/204 X |
| 4,409,275 | 10/1983 | Samowich | 428/15 X |
| 4,421,816 | 12/1983 | Arnold | 428/204 X |

FOREIGN PATENT DOCUMENTS

| | | | |
|---|---|---|---|
| 494165 | 7/1953 | Canada | 446/321 |
| 680388 | 10/1952 | United Kingdom | 446/341 |

*Primary Examiner*—Robert A. Hafer
*Assistant Examiner*—D. Neal Muir
*Attorney, Agent, or Firm*—Barnes, Kisselle, Raisch, Choate, Whittemore & Hulbert

[57] ABSTRACT

An eye for adhesive attachment to a doll head comprises a backing sheet of a flexible waterproof white fabric. There is a generally annular deposit on the fabric of a waterproof coloring material such as an acrylic having the shape and color of the iris of an eye. There also is a generally circular deposit on the fabric of a black waterproof coloring material such as an acrylic centered with respect to the annular deposit and dimensioned to represent the pupil of the eye. A protective cover of transparent waterproof material such as an acrylic is applied over the fabric and deposits.

1 Claim, 8 Drawing Figures

ATTACHABLE EYE FOR DOLLS

BRIEF SUMMARY

In the past, eyes for dolls have been painted already on the surface of the doll head, or in some cases more elaborate three dimensional eyes have been separately fabricated and attached to or inset into the head.

The present invention is an essentially flat flexible eye construction adapted to be adhesively attached to the head but which creates the illusion of depth and at the same time facilitates the application to the head and requires no particular skill as required when the eyes are painted on the doll head.

A flexible washable white backing sheet is used, which is given an over-all coating on one side by a uniform base coat of a white washable material such as an acrylic or a lead-free oil based textile ink. This coating and all subsequent deposits are applied by the familiar silk screen process.

The eye constructions are built up on the flexible washable backing sheet by applying thereto a multiplicity of circular or annular first deposits of a washable coloring material such as an acrylic, or lead-free oil based textile ink, of a color selected to represent the irises of the eye. The deposits are placed within the boundry of the sheet so that the user may cut the iris portion out of the sheet, leaving a complete or partial white border of desired shape.

The pupil of the eye is represented by a second deposit of circular shape centered with respect to the first deposit, and of a black washable material, such as an acrylic or lead-free oil based textile ink. If the first deposit is a complete circular area, the second deposit is applied over the first deposit. If the first deposit is of annular shape, the second deposit is or may be within the center opening of the annulus usually with peripheral overlap.

At the same time as applying the pupil simulating black central deposit, it is preferred to apply a narrow black border surrounding the iris-simulating deposit.

Additional separate deposits are preferably overlaid on the iris-forming deposit of different color or shade, to simulate "flecks" in the iris, and more particularly to points of scintilation or irridescence to simulate "sparkle" in the iris-simulating deposit. For this purpose, small particles of glass, mica, or the like, may be applied on or over the iris-simulating deposit.

White areas are provided of limited extent, and particular effective results are obtained by applying a fluorescent material in the form of a white powder in a transparent fluid carrier.

Finally, a protective cover in the form of a layer of transparent waterproof material such as an acrylic is provided.

COMPLETE DESCRIPTION

The eye representation or simulations of the present invention are intended for use with any doll construction, but are particularly adapted for use where the head of the doll has no separate eye elements attached thereto or applied thereon.

In a particular product, a sheet has one hundred and forty four separate "eyes" arranged in a 12×12 pattern. The individual eyes are arranged in pairs, and preferably all seventy two pairs of eyes are different in detail, so that the customer has a wide selection and may thus exercise considerable originality in the final product.

Figure 1:
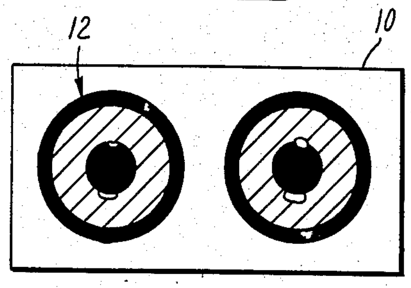
FIG. 1 is a view of a rectangular piece of fabric on which two eye representations are formed.

In FIG. 1, there is illustrated a small section of a backing sheet 10 on which are two built-up eye representations 12 as will subsequently be described in detail. The user will cut the eye representations to a desired shape, four of which are shown in FIGS. 5 through 8, leaving a white border 13 of selected configuration surrounding the iris representation and constituting a simulation of the white portion of the eye.

In the manufacture of the adhesively applied eye representation, a large sheet 11 of flexible washable fabric (woven or non-woven) is selected of a size to receive a multiplicity of eye representations, as for example one hundred and forty four. A suitable material is a non-woven fibrous material sold under the tradename "Pellon" manufactured by The Pellon Company and referred to as an interfacing. This material is washable and resembles paper.

It is desired that this backing sheet shall be white so that portions thereof surrounding the iris-simulating portion, as applied to the doll head, will simulate the white of the eye. If it is not clear white, a layer of white or offwhite, waterproof coloring material is applied. It is preferred to use a white oil based textile ink, or an acrylic for this purpose.

Figure 2:
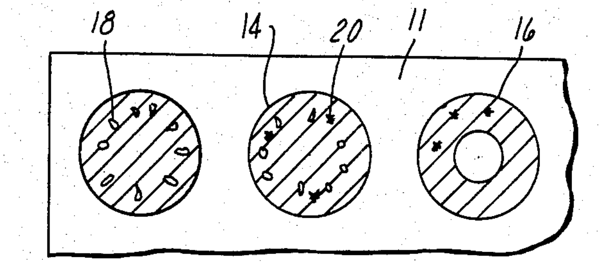
FIG. 2 is a fragmentary view of a fabric sheet showing the step of forming the iris representation thereon.

After the coating of white material is applied and dried, the next step is to apply a multiplicity of circular or annular deposits seen at 14 in FIG. 2. These deposits are of the color selected for the iris of the eye, as for example, blue or brown. Since the central portion of the iris representation is to receive the black pupil representation, the deposit of FIG. 2 may if desired be annular as shown at 16 in FIG. 2.

It is preferred to make this iris deposit 14 or 16 and the other deposits to be described by the well known silk screen purposes, which permits accurate control of the shape and location of the deposits.

A material suitable for the deposits has been found to be an acrylic, which is waterproof and provides a clear lustrous surface of the selected color.

If desired, the iris representation may be modified to provide different areas of the same color but somewhat varying shades. Similarly, light small radial areas of a different color, as suggested at 18 may be super-imposed on the solid color background.

It will be understood that the silk screen process of application provides for successive deposits of different colors, to areas of selected size and shape. Thus, the iris-representation area 14 may be produced by a multiplicity of successive overlays of harmonizing or contrasting color, as desired.

Particularly effective results are obtained by the addition of iridescence, scintilating or sparkling particles, preferably as an addition by super-imposition over the solid color background and such particles are suggested by the small stars 20 seen in FIG. 2. The particles may be glass, mica, or the like.

Figure 3:
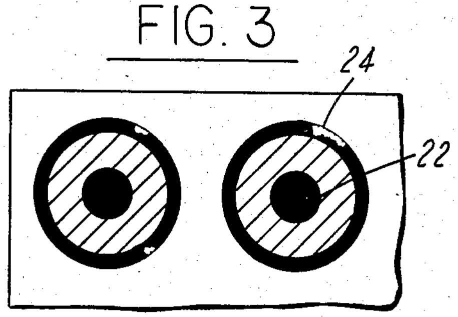
FIG. 3 is a view similar to FIG. 2, showing the step of forming the pupil representation thereon.

Following completion of the deposits which together produce the iris-simulating area 14, an additional deposit is made as seen in FIG. 3. Here a generally circular area 22 receives a deposit of black, waterproof material such as an acrylic, to simulate the pupil of the eye. This area 22 is centered with respect to the areas 14 or 16 and is of the appropriate size to represent the pupil of the eye.

At the same time, or if desired in a separate step an annular deposit 24 of black waterproof acrylic is made to form a border for the iris-simulation.

Figure 4:
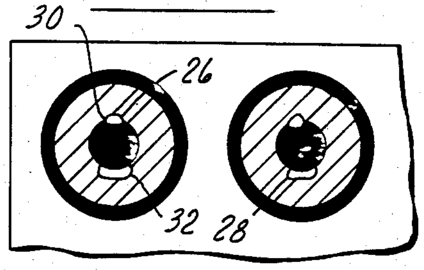
FIG. 4 is a view similar to FIGS. 2 and 3 showing the step of adding a contrasting area to the eye representation.

To produce a more realistic effect, small deposits 26 and 28 are super-imposed on the areas 14 or 16 and 22. These deposits may be of white waterproof acrylic. The deposit 26 covers a small area at the top of area 14 as seen in FIG. 4 and may be outlined with a black border 30. The deposit 28 is at the bottom of pupil area 22 and as shown is somewhat elongated circumferentially. This area 28 may also be provided with a narrow black border at its bottom as indicated at 32.

Figure 8:
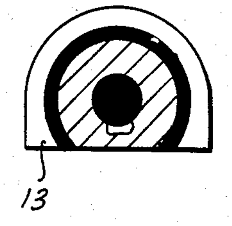

In FIG. 8, the lower portion in the iris is cut-off.

In addition, it is desirable in some cases to make the white deposits within the iris fluorescent by the addition of a white fluorescent powder in a transparent carrier to the previously applied white.

Finally, the entire fibrous sheet 11 with the deposits thereon, is given a covering of a transparent waterproof acrylic to protect the eye simulations and to provide a gloss over the eye simulations.

It will be understood that in general, previously applied fluid material is allowed to completely dry before further additions.

In use, the individual eye simulations are cut from the sheet, leaving a border area desired shape and extent as a representation of the white of the eye. These cut-out eye simulations are applied with a suitable permanent waterproof adhesive, to the eye locations on the head of the doll.

Figure 5:
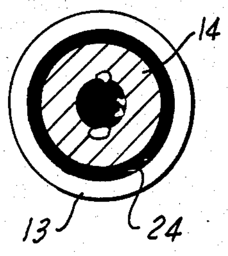
FIGS. 5 through 8 illustrate eye units trimmed to different shapes.

In FIG. 5, the border area 13 is annular, surrounding the iris area 14 and its border 24.

Figure 6:
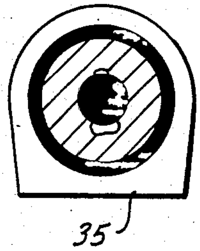
Figure 7:
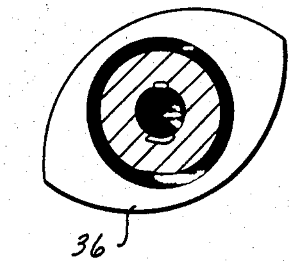

In FIG. 6, the border area 35 is differently shaped, and in FIG. 7, the white-simulation portion 36 is generally almond-shaped.

There is thus provided easy-to-use eye simulation of exceptionally attractive appearance which can be produced economically and applied by anyone without prior experience, or particular skill. The finished product, at least as far as the eye simulations are concerned, is waterproof so that the owner may wash the doll without adversely affecting the eye simulation.

I claim:

1. The method of making eye simulations for adhesive application to the head of a doll which comprises providing a flexible backing sheet of washable fibrous material, applying a first coating on said entire sheet of a white waterproof material, depositing upon said first coating a plurality of spaced apart circular areas of a waterproof coloring material of a color selected to represent irises of eyes, depositing centrally on each iris-simulating area a circular area of a black waterproof coloring material to simulate the pupil of the eye, applying another coating over said deposits of a transparent waterproof material to provide a gloss over the eye simulations, and finally trimming each eye simulation from the sheet to leave a border of the white backing sheet surrounding each iris-simulating area to represent the white of the eye.

* * * * *